(12) United States Patent
Pierce et al.

(10) Patent No.: US 10,078,794 B2
(45) Date of Patent: Sep. 18, 2018

(54) SYSTEM AND METHOD FOR IMPROVED GENERAL OBJECT DETECTION USING NEURAL NETWORKS

(71) Applicant: Pilot AI Labs, Inc., Sunnyvale, CA (US)

(72) Inventors: Brian Pierce, Santa Clara, CA (US); Elliot English, Stanford, CA (US); Ankit Kumar, San Diego, CA (US); Jonathan Su, San Jose, CA (US)

(73) Assignee: PILOT AI LABS, INC., Sunnyvale, CA (US)

( * ) Notice: Subject to any disclaimer, the term of this patent is extended or adjusted under 35 U.S.C. 154(b) by 108 days.

(21) Appl. No.: 15/365,739

(22) Filed: Nov. 30, 2016

(65) Prior Publication Data
US 2017/0154425 A1    Jun. 1, 2017

Related U.S. Application Data
(60) Provisional application No. 62/261,260, filed on Nov. 30, 2015.

(51) Int. Cl.
*G06K 9/00* (2006.01)
*G06K 9/46* (2006.01)
(Continued)

(52) U.S. Cl.
CPC ............ *G06K 9/4671* (2013.01); *G06N 3/08* (2013.01); *G06N 5/04* (2013.01); *G06T 7/0042* (2013.01);
(Continued)

(58) Field of Classification Search
USPC ...................................................... 382/103
See application file for complete search history.

(56) References Cited

U.S. PATENT DOCUMENTS 6,285,992 B1      9/2001  Kwasny et al.
9,704,044 B1 *    7/2017  Curlander .......... G06K 9/00671
(Continued)

FOREIGN PATENT DOCUMENTS

WO       2017095948 A1    6/2017

OTHER PUBLICATIONS

"International Application Serial No. PCT/US16/64254, International Search Report and Written Opinion dated Feb. 16, 2017", 7 pages.

*Primary Examiner* — Jerome Grant, II
(74) *Attorney, Agent, or Firm* — Kwan & Olynick LLP

(57) ABSTRACT

In general, certain embodiments of the present disclosure provide methods and systems for object detection by a neural network comprising a convolution-nonlinearity step and a recurrent step. In a training mode, a dataset is passed into the neural network, and the neural network is trained to accurately output a box size and a center location of an object of interest. The box size corresponds to the smallest possible bounding box around the object of interest and the center location corresponds to the location of the center of the bounding box. In an inference mode, an image that is not part of the dataset is passed into the neural network. The neural network automatically identifies an object of interest and draws a box around the identified object of interest. The box drawn around the identified object of interest corresponds to the smallest possible bounding box around the object of interest.

20 Claims, 11 Drawing Sheets

(51) Int. Cl.
*G06N 3/08* (2006.01)
*G06N 5/04* (2006.01)
*G06T 7/00* (2017.01)

(52) U.S. Cl.
CPC ............... *G06T 2207/10004* (2013.01); *G06T 2207/20084* (2013.01)

(56) References Cited

U.S. PATENT DOCUMENTS

| | | | |
|---|---|---|---|
| 9,779,546 B2 * | 10/2017 | Hunt | G06T 17/20 |
| 9,818,235 B1 * | 11/2017 | Rotman | G07B 17/00661 |
| 2005/0278408 A1 * | 12/2005 | Matsumoto | H04L 67/1008 709/200 |
| 2014/0180989 A1 | 6/2014 | Krizhevsky et al. | |
| 2015/0100530 A1 | 4/2015 | Mnih et al. | |
| 2015/0170002 A1 | 6/2015 | Szegedy et al. | |
| 2017/0337512 A1 * | 11/2017 | Saito | G06Q 30/0635 |

\* cited by examiner

SYSTEM AND METHOD FOR IMPROVED GENERAL OBJECT DETECTION USING NEURAL NETWORKS

CROSS REFERENCE TO RELATED APPLICATIONS

This application claims priority under 35 U.S.C. § 119(e) to U.S. Provisional Application No. 62/261,260, filed Nov. 30, 2015, entitled SYSTEM AND METHOD FOR IMPROVED GENERAL OBJECT DETECTION USING NEURAL NETWORKS, the contents of each of which are hereby incorporated by reference.

TECHNICAL FIELD

The present disclosure relates generally to machine learning algorithms, and more specifically to object recognition and detection.

BACKGROUND

Systems have attempted to use various neural networks and computer learning algorithms to identify objects within an image or a series of images. However, existing attempts to identify objects are not successful because the methods of pattern recognition and estimating location of objects are inaccurate and non-general. Furthermore, existing systems attempt to identify objects by some sort of pattern recognition that is too specific, or not sufficiently adaptable, as the object changes between images. Thus, there is a need for an enhanced method for training a neural network to detect and identify objects of interest with increased accuracy by utilizing improved computational operations.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for improved object detection by a neural network. According to various embodiments, a method for object detection using a neural network is provided. The method comprises a training mode and an inference mode. In yet another embodiment, a system for neural network object detection is provided. The system includes one or more processors, memory, and one or more programs stored in the memory. The one or more programs comprises instructions to operate in a training mode and an inference mode. In yet another embodiment, a computer readable storage medium is provided, which stores one or more programs configured for execution by a computer. The one or more programs comprises instructions to operate in a training mode and an inference mode.

In the training mode, a dataset is passed into the neural network, and the neural network is trained to accurately output a box size and a center location of an object of interest. The box size corresponds to the smallest possible bounding box around the object of interest and the center location corresponds to the location of the center of the bounding box. In the inference mode, an image that is not part of the dataset is passed into the neural network. The neural network automatically identifies an object of interest and automatically draws a box around the identified object of interest. The box drawn around the identified object of interest corresponds to the smallest possible bounding box around the object of interest. The neural network comprises a convolution-nonlinearity step and a recurrent step. In certain embodiments, the dataset may comprise a plurality of images with known identified objects of interests. According to various embodiments, parameters in the neural network may be updated using a stochastic gradient descent during the training mode. In the inference mode of certain embodiments, the neural network will automatically output exactly the same number of boxes as the number of identifiable objects of interest.

According to various embodiments, the convolution nonlinearity step may comprise a convolution layer and a rectified linear layer. In other embodiments, each layer in the convolution-nonlinearity step may take a third-order tensor as input and output a modified third-order tensor. In further embodiments, the convolution-nonlinearity step may comprise a plurality of convolution-nonlinearity layer pairs that each comprise a convolution layer followed by a rectified linear layer. In other embodiments, the convolution-nonlinearity step may consist of five convolution-nonlinearity layer pairs that each comprises a convolution layer followed by a rectified linear layer.

According to various embodiments, the recurrent step may comprise a quadratic recurrent layer. In other embodiments, the recurrent step may comprise a plurality of recurrent layer pairs that each comprises a quadratic recurrent layer followed by a linear layer. In some embodiments, the quadratic recurrent layer may take as input two first-order tensors and output a single first-order tensor. In various embodiments, the output of a first quadratic recurrent layer may be used as input into a second quadratic layer. In certain embodiments, the linear layer may output a first-order tensor with at least one dimension. In some embodiments, the at least one dimension may include the x and y coordinates of the center of the bounding box, the height of the bounding box, the width of the bounding box, and a probability that the bounding box is accurate. In some embodiments, the output of a quadratic recurrent layer may be used as input into a subsequent quadratic recurrent layer unless a linear layer in the recurrent step outputs a probability of less than 0.5 that the bounding box is accurate.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1A:
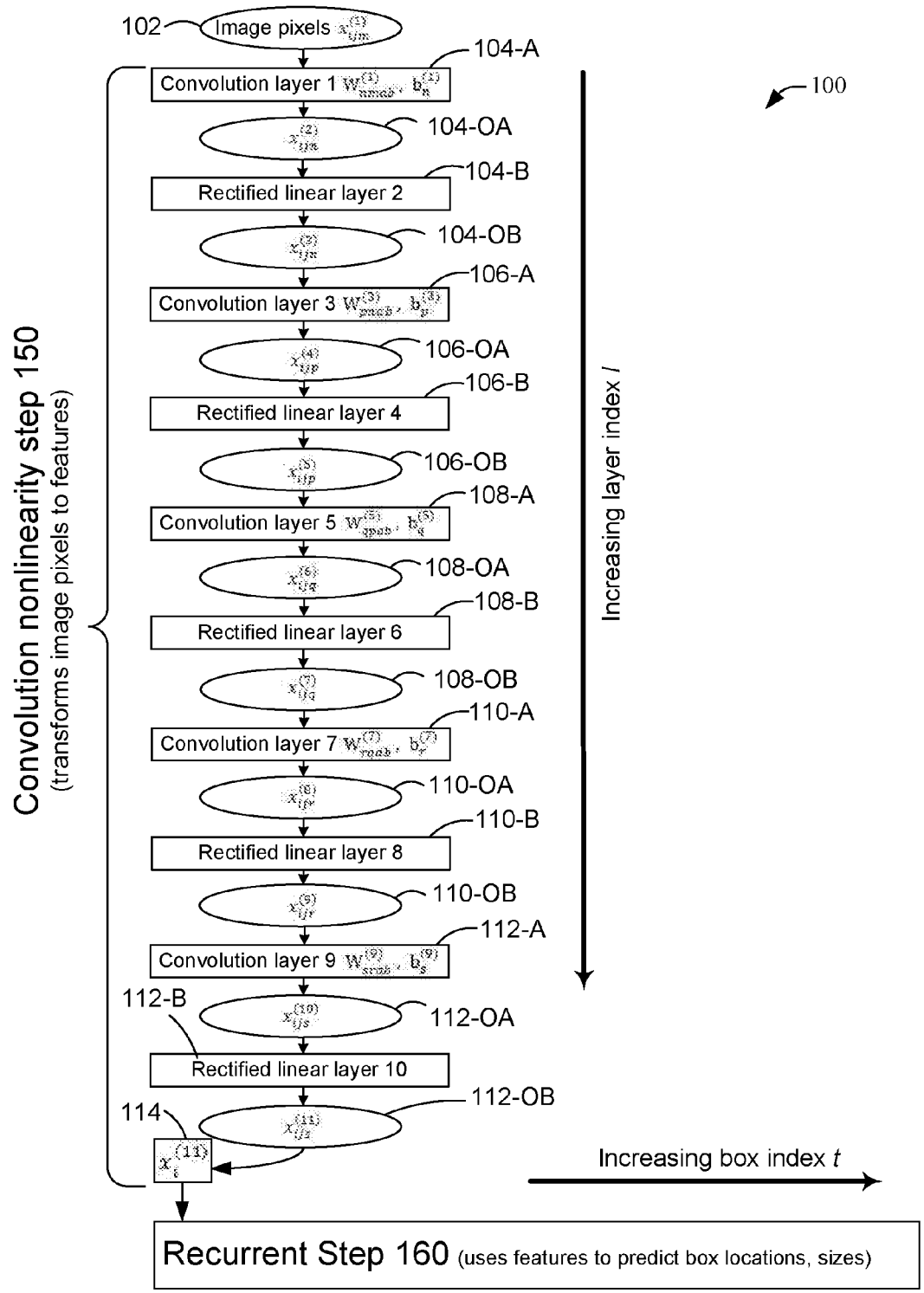
FIGS. 1A and 1B illustrate a particular example of computational layers implemented in a neural network in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular algorithms However, it should be noted that the techniques of the present disclosure apply to various other algorithms. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a method for object detection using a neural network is provided. The method comprises a training mode and an inference mode. In the training mode, a dataset is passed into the neural network, and the neural network is trained to accurately output a box size and a center location of an object of interest. The box size corresponds to the smallest possible bounding box around the object of interest and the center location corresponds to the location of the center of the bounding box. In the inference mode, an image that is not part of the dataset is passed into the neural network. The neural network automatically identifies an object of interest and automatically draws a box around the identified object of interest. The box drawn around the identified object of interest corresponds to the smallest possible bounding box around the object of interest. The neural network comprises a convolution-nonlinearity step and a recurrent step.

Example Embodiments

According to various embodiments, a system for general object detection may use a labeled dataset to train the parameters of a neural network so that the neural network can accurately output the box size and the center location for one or more objects of interests located in new images that the neural network was not trained on. Examples of objects of interests may include, but are not limited to, individual faces, heads, or other body parts, cars, animals, trees, etc. In some embodiments, a labeled dataset may include a collection of images where, for each image, the following information is provided as pixel coordinates: the center location, height, and width of the smallest possible bounding box around each object of interest within the image. In other embodiments, other information may be provided for each object of interest. In other embodiments, the information may be provided in other various formats.

According to various embodiments, the neural network may operate in two modes. The first mode may be a "training" mode in which the initial parameters, which start from random values, are slowly updated by comparing predicted boxes output by the neural network with the information of the labeled dataset. In some embodiments, the initial parameters updated, or trained, by stochastic gradient descent, which slowly updates the initial random values of parameters such that the neural network outputs increasingly accurate center location, height, and width for the minimum bounding box around each object of interest within an image. The second mode may be an "inference" mode in which the neural network applies the updated parameters to predict objects of interest and output the center location, height, and width for the minimum bounding box around each of the predicted objects of interest. In some embodiments, the neural network may identify objects of interest within a series of images with a desired accuracy rate in real-time. In some embodiments, real-time may comprise a rate of approximately 25 frames-per-second.

According to various embodiments, the neural network may include a convolution-nonlinearity step and a recurrent step that are implemented in both the training mode and the inference mode. In some embodiments, the convolution-nonlinearity step transforms the pixels of images into feature tensors that the neural network may use for object detection.

In some embodiments, the recurrent step translates the feature tensors from the convolution-nonlinearity step into the boxes identifying the objects of interest. Each step comprises a number of different computational layers. A "layer" refers to a mathematical function which has one or more input tensors and one or more output tensors. In some embodiments, a layer may include one or more tensors of parameters which are updated, or trained, using a stochastic descent algorithm. Such computational layers may include convolutional layers, rectified-linear layers, and linear layers. In other embodiments, other various layers may be implemented in the neural network. In an embodiment, the neural network additionally uses a quadratic recurrent layer. In various embodiments, the neural network combines sequential layers in a novel combination for the task of object detection. In some embodiments, the neural network may be trained to recognize a more general pattern for an object type to identify an object from any angle in any sense. In an embodiment, the network may be built from a sequence of layers, with the output from one layer feeding in as the input to the next layer, as further described in FIGS. 1A and 1B.

Figure 1B:
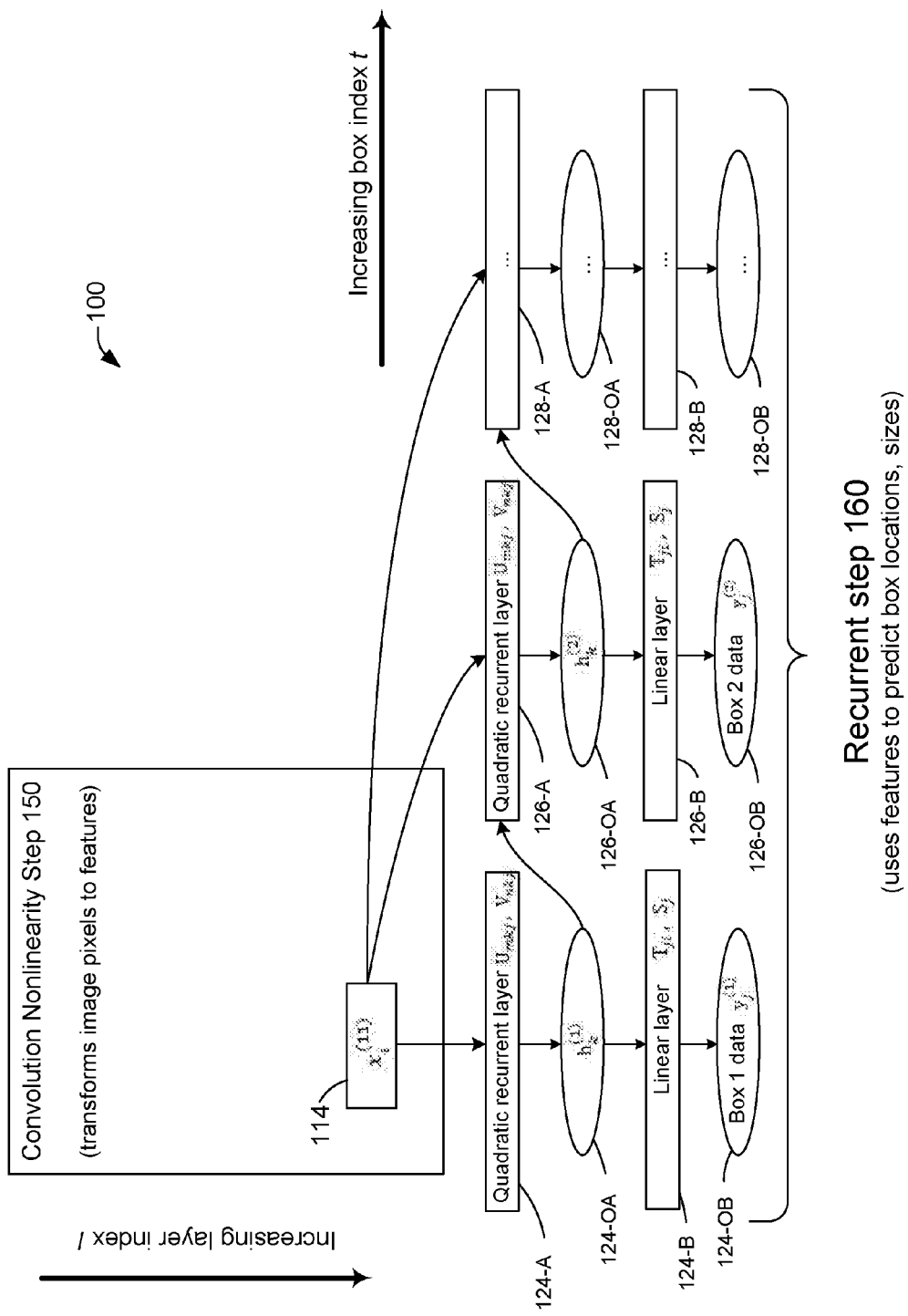

FIGS. 1A and 1B illustrate a particular example of computational layers implemented in a neural network 100 in accordance with one or more embodiments. According to various embodiments, neural network 100 includes convolution-nonlinearity step 150 depicted in FIG. 1A and recurrent step 160 depicted in FIG. 1B. In some embodiments, both steps are implemented by neural network 100 in the training mode and in the inference mode. In some embodiments, convolution-nonlinearity step 150 includes a plurality of layers including convolution layers 104-A, 106-A, 108-A, 110-A, and 112-A, with respective outputs 104-OA, 106-OA, 108-OA, 110-OA, and 112-OA. Convolution-nonlinearity step 150 may further include rectified linear layers 104-B, 106-B, 108-B, 110-B, and 112-B, with respective outputs 104-OB, 106-OB, 108-OB, 110-OB, and 112-OB. In some embodiments, recurrent step 160 of neural network 100 includes a plurality of layers including quadratic recurrent layers 124-A, 126-A, and 128-A, with respective outputs 124-OA, 126-OA, and 128-OA. Recurrent step 160 may further include linear layers 124-B, 126-B, and 128-B, with respective outputs 124-OB, 126-OB, and 128-OB.

Convolution-Nonlinearity Step

In various embodiments, convolution-nonlinearity step 150 of neural network 100, depicted in FIG. 1A, involves one or more convolution-nonlinearity operations. In some embodiments, each convolution-nonlinearity operation may include inputting the third-order tensor of the image pixels of an image into a pair of computational layers (or "convolution-nonlinearity layer pairs") comprising a convolution layer and a rectified-linear layer. The first of such convolution-nonlinearity layer pairs is convolution-nonlinearity pair 104 which includes convolution layer 104-A and rectified linear layer 104-B. In some embodiments, the first input of neural network 100 is image pixels 102 Image pixels 102 may be fed into convolution layer 104-A as a third-order tensor with three dimensions including the "height", "width", and "channels" of image 102. The input of image pixels 102 may be denoted as $x^{(l+1)}_{ijm}$ (the three subscripts show that the tensor is a third order tensor with one subscript representing each dimension of the tensor). Convolutional layers, such as convolutional layer 104-A may be denoted as layer number 1 and have a third-order tensor as input (denoted as $x^{(l)}_{ijm}$) and a third-order tensor as output (de-noted as $x^{(l+1)}_{ijn}$). Convolutional layers also comprise two parameter variables, including a fourth order tensor (denoted as $W^{(l)}_{nmab}$), and a first order tensor (denoted as $b^{(l)}_n$). The equation to compute the output of a convolution layer l given the input is:

$$x^{(l+1)}_{ijn} = \Sigma_m \Sigma_a \Sigma_b W^{(l)}_{nmab} x^{(l)}_{(i-a)(j-b)m} + b^{(l)}_n$$

Using this equation, convolution layer 104-A processes the third order tensor input $x^{(1)}_{ijm}$ of image pixels 102 and produces a third order tensor output 104-OA denoted as $x^{(2)}_{ijn}$. In some embodiments, convolutional layers, such as convolutional layer 104-A, may exhibit desired properties for training neural networks for image processing tasks, such as object detection. Specifically, the parameters $W^{(l)}_{nmab}$ act as a filter over the input, such that each pixel in the output third-order tensor $x^{(l+1)}_{ijn}$ depends only on the neighboring pixels from the input third-order tensor $x^{(1)}_{ijm}$. In other embodiments, other types of computational layers may be used instead of the convolution layer previously described.

The second computational layer in convolution-nonlinearity layer 104 is layer 104-B, which comprises a rectified-linear layer, which is a non-linear layer. In some embodiments, non-linear layers, such as rectified-linear layer 104-B, may be included in neural network 100 to allow learning of complicated functions. Excluding non-linear layers, such as layer 104-B, may cause a neural network, such as neural network 100, to be saturated and reduced to a single, simplified, linear layer. The rectified-linear nonlinearity layer is chosen over other types of nonlinear layers to avoid saturation. Saturation may occur when a layer, or type of layer, in a neural network continues to output the same numerical value, such as "1," even though the inputs into that layer, or type of layer, are changing. For example, a neural network that includes one or more sigmoid function layers may experience saturation when the values of parameters in layers preceding the sigmoid function layers become too large. In contrast, a rectified-linear layer, such as layer 104-B, does not experience saturation during training. Given an input tensor for a rectified-linear layer l (denoted by $x^{(l)}_{ijn}$) and an output tensor (denoted by $x^{(l+1)}_{ijn}$) the equation for the "rectified-linear layer is:

$$x^{(l+1)}_{ijn} = \max(0, x^{(l)}_{ijn})$$

In FIG. 1A, rectified linear layer 104-B processes the third order tensor $x^{(2)}_{ijn}$ of output 104-OA and produces a third order tensor output 104-OB denoted as $x^{(3)}_{inj}$. Output 104-OB is then fed into the next successive convolution-nonlinearity layer pair 106, which includes convolution layer 106-A and rectified linear layer 106-B with respective outputs 106-OA and 106-OB. The final output of each convolution-nonlinearity layer pair is similarly fed into the next successive convolution-nonlinearity pair. Convolution-nonlinearity pair 108 includes convolution layer 108-A and rectified linear layer 108-B with respective outputs 108-OA and 108-OB. Convolution-nonlinearity pair 110 includes convolution layer 110-A and rectified linear layer 110-B with respective outputs 110-OA and 110-OB. Convolution-nonlinearity pair 112 includes convolution layer 112-A and rectified linear layer 112-B with respective outputs 112-OA and 112-OB. These computational layer pairs within convolution-nonlinearity step 150 allow neural network 100 to transform the input pixels 102 into an output that includes features that are better suited for performing the task of object detection. The output 112-OB, which is a third-order tensor depicted as $x^{(11)}_{ijs}$, may be converted to first-order tensor 114. After the input information is fed through each convolution-nonlinearity layer pair, and also subsequently fed through the remainder of neural network 100, a stochastic gradient descent algorithm is implemented to update the parameters within each of the computational layers using the predictions made by neural network 100 and the given labels from the dataset.

As depicted in FIG. 1A, the convolution-nonlinearity step 150 of neural network 100 is composed of five convolution-nonlinearity layer pairs, 104, 106, 108, 110, and 112. In other embodiments, there may be more or less convolution-nonlinearity layer pairs than shown in FIG. 1A. Each convolution-nonlinearity layer pair transforms the input (into each layer pair) into a higher-level feature tensor comprising a high-dimensional vector representation of the original image pixels 102. The higher-level feature tensor outputs are used for performing the task of object detection (the higher-level tensor is the output tensor of the second layer in each layer pair). For example, output 106-OB, denoted as $x^{(5)}_{ijp}$, is the input into convolution-nonlinearity pair 108. Convolution-nonlinearity pair 108 transforms tensor 106-OB into a higher-level output tensor 108-OB, denoted as $x^{(7)}_{ijq}$. The more convolution-nonlinearity layer pairs in convolution-nonlinearity step 150, the more accurate will be the predictions made by neural network 100 in detecting objects in new images. However, an increase in the number of convolution-nonlinearity pairs will also increase in the difficulty of training of neural network 100 during the training mode. For example, a hundred convolution-nonlinearity pairs would yield the potential for a deeper and very accurate system. However, such a deeper neural network with more computational layers is more difficult to train, requiring a larger dataset to fully train the network to perform predictions with the desired accuracy. Additionally, adding more convolution-nonlinearity pairs would increase computing time for neural network 100 to perform predictions.

In a certain embodiment, five convolution-nonlinearity layer pairs may yield sufficient accuracy for tracking objects of interest for particular application, such as drone control for following objects of interest, that require estimating relative physical distance of objects in an image. In such embodiments, computer chips and processing times may be optimized such that a neural network 100 with five convolution-nonlinearity layer pairs may detect objects within a series of images in real-time.

Recurrent Step

According to various embodiments, recurrent step 160, depicted in FIG. 1B, follows convolution-nonlinearity step 150. In some embodiments, recurrent step 160 comprises one or more computational layers that may translate the high-dimensional vector representation of image pixels 102 from the final high-level feature tensor output, such as output 112-OB from convolution-nonlinearity step 150, into boxes for the objects of interest located in each image. In some embodiments, recurrent step 160 involves one or more recurrent layers, such as quadratic recurrent layers 124-A, 126-A, and 128-A, with respective outputs 124-OA, 126-OA, 128-OA. In other embodiments, recurrent step 160 may alternatively or additionally include one or more linear recurrent layers. A quadratic recurrent layer has a similar structure to a linear recurrent layer, including the same number of inputs (2), outputs (1), and number of parameter tensors (2), but the actual equation for computing the output given such inputs is different. In the following explanation comparing a quadratic recurrent layer and a linear recurrent layer, notation for variables will be shared. When referring to a variable that is shared by both types of layers, the term "recurrent layer" will be used to refer to both types of layers.

A recurrent layer has two input tensors (denoted as $x_i$ and $h^{(t)}_j$), both of which are first order. A higher order tensor, such as a third order tensor, may be converted to a lower order tensor as all the dimensions can be combined into a single dimension. For example, all values in a third-order tensor may be listed in a singular vector form. As previously described with reference to FIG. 1A, output 112-OB, which is a third-order tensor depicted as $x^{(11)}_{ijs}$, may be converted to first-order tensor 114. The translated first-order tensor 114 may be depicted as $x^{(11)}_i$. This first-order tensor 114 may be used as the first of two input tensors for a recurrent layer, such as quadratic recurrent layers 124-A, 126-A, 128-A, etc. The second input tensor, $h^{(t)}_j$, is derived from the output of a previous quadratic recurrent layer of neural network 100. The first quadratic recurrent layer of recurrent step 160, such as layer 124-A, may utilize an initial zero value for the $h^{(t)}_j$ input tensor, that may be depicted as $h^{(0)}_j$. The recurrent layers also provide one output tensor, denoted as $h^{(t+1)}_k$, such as output 124-OA (denoted as $h^{(1)}_k$ in FIG. 1B). As previously mentioned, such output tensor 124-OA may be used as the second input tensor for a subsequent recurrent layer, such as 126-A. The recurrent layers also include two parameter tensors. The order of the parameter tensors is different between the linear recurrent layer and the quadratic recurrent layer. The linear recurrent layer parameter tensors are second order, and are denoted as $U_{ki}$ and $V_{kj}$. The quadratic recurrent layer parameter tensors are third order, and are denoted as $U_{mki}$ and $V_{nkj}$ as shown in 124-A and 126-A. The equation for computing the output of a linear recurrent layer is:

$$h^{(t+1)}_k = \Sigma_i (U_{ki} x_i) + \Sigma_j V_{kj} h^{(t)}_j)$$

The equation for computing the output of a quadratic recurrent layer is:

$$h^{(t+1)}_k = \Sigma_m \Sigma_i (x_m U_{mki} x_i) + \Sigma_n \Sigma_j (h^{(t)}_n V_{nkj} h^{(t)}_j)$$

Because a quadratic recurrent layer, such as layers 124-A and 126-A, has parameter tensors with higher orders than the parameter tensors of a linear recurrent layer, a neural network 100 that utilizes quadratic recurrent layers may have a higher capacity to solve complicated tasks, such as object detection, because of the higher complexity of the layers. The use of quadratic recurrent layers improves the accuracy of a neural network 100 and allows neural network 100 to have improved learning capabilities during a training mode by allowing a higher maximum accuracy value. For example, the final accuracy of neural network 100 with quadratic recurrent layers after being fully trained using a given dataset of images would be higher than that of neural network 100 with linear recurrent layers instead of quadratic recurrent layers, given the same dataset. Furthermore, a quadratic recurrent layer also provides more accurate predictions in inference mode by providing a quadratic approximation, as opposed to a linear approximation provided by a linear recurrent layer. The inputs ($x_i$ and $H^{(t)}_j$) of a quadratic recurrent layer multiply each other while also multiplying the parameter tensors ($U_{mki}$ and $V_{nkj}$). This multiplication with itself allows for a more complex function, which yields more accurate box predictions. In other words, standard neural networks only multiply input with weights. However, using the quadratic layers, a neural network can multiply an input with itself and weights, which lead to higher accuracy in the results.

As previously mentioned, first-order tensor 114 may be a first input into each quadratic recurrent layer, including

124-A, 126-A, 128-A, etc. As the first recurrent layer, quadratic recurrent layer 124-A may then use first order tensor 114 and an initial zero value for the $h^{(t)}_j$ input tensor to generate output 124-OA. Output 124-OA of quadratic recurrent layer 124-A is also input into a standard linear layer, such as linear layer 124-B. Similarly, the output 126-OA of quadratic recurrent layer 126-A is fed into a subsequent quadratic recurrent layer 128-A, as well as linear layer 126-B. In some embodiments, linear layers, such as 124-B, may be utilized as a final layer which takes in tensor input 124-OA and outputs a first order tensor 124-OB with a dimension of five. In some embodiments, the input tensor is denoted as $h^{(t)}_k$ the output tensor is denoted as $y^{(t)}_j$, and the parameter tensors are denoted as $T_{ji}$ and $s_j$. The equation for the output 124-OB of linear layer 124-B is:

$$y_j = \Sigma_i(T_{ji}h_i) + s_j.$$

In some embodiments, the five dimensions of an output $y^{(t)}_j$ of a linear layer, such as output 124-OB, may refer to: the (x, y) coordinates of the center of the box, the height of the box, the width of the box, and a probability that the box (location and size) which neural network 100 has predicted is accurate. This probability allows neural network 100 to assign a confidence to the output boxes. During training mode in certain embodiments, neural network 100 is trained to have a probability of 1 for any box which matches a label, and a probability of 0 for any boxes it outputs which do not correspond to a label. In some embodiments, if the probability is greater than or equal to 0.5, neural network 100 interprets the box as a correct prediction. In some embodiments, if the probability is less than 0.5, neural network 100 ignores the prediction as incorrect.

In certain embodiments, recurrent step 160 may include multiple recurrent layer pairs, such as recurrent layer pair 124, comprising a quadratic recurrent layer and linear layer. As previously described, the output of each quadratic recurrent layer is fed into the linear layer of the recurrent layer pair and a subsequent quadratic recurrent layer in a subsequent recurrent layer pair. For example, output 124-OA of quadratic recurrent layer 124-A is fed into a subsequent quadratic recurrent layer 126-A, as well as linear layer 124-B. Recurrent layers are termed "recurrent" because the output is fed back into the layer as one of the two inputs. A recurrent step 160 is implemented for one object type, such as people, vehicles, trees, etc., and multiple recurrent steps 160 may be implemented for each image. Each recurrent layer pair in a recurrent step 160, such as layer pair 124, corresponds to a single box being output for an identified object of a single object type in an image. Subsequent boxes are output by quadratic recurrent layer-linear layer pairs until neural network 100 outputs a probability of a box that is less than 0.5, at which point, neural network 100 determines that there are no more boxes to be output. If neural network 100 fails to output a box for any object of interest, whether identified or not, neural network 100 is treated as if it output a box of size 0 with coordinates (0, 0), and probability 0. If there are objects of another type detected, neural network 100 then implements another recurrent step 160 for objects of that type.

In some embodiments, recurrent layers, such as quadratic recurrent layers and linear recurrent layers, may be well suited to tasks of generating a number of outputs, such as boxes, that vary from one image to the next. For example, one image may include only one object of interest, and therefore only one box to be output by neural network 100. Another image may include fifty objects of interest, and therefore fifty boxes may be output by neural network 100.

However, a recurrent layer, such as quadratic recurrent layer 124-A, may include a state vector in its output 124-OA, which is then fed into a subsequent recurrent layer 126-A. Such a state vector may be trained to keep track of which boxes neural network 100 has already output, and learns to output the boxes one at a time, without repeating a box. Other types of layers, such as linear layers, may have a fixed number of outputs and must output a fixed number of boxes. For example, a linear layer may be designed to output a tensor with five hundred dimensions corresponding to the five dimensions of each output box. This means that that linear layer must output one hundred boxes and cannot identify more than one hundred objects in each image. A linear layer may be designed to output a tensor with a very large number of tensors, but it may be impractical due to increased computational time. This may also lead to inaccuracies when there are fewer objects in an image because a linear layer with five hundred outputs must output one hundred boxes for each image despite the number of actual objects.

Figure 2:
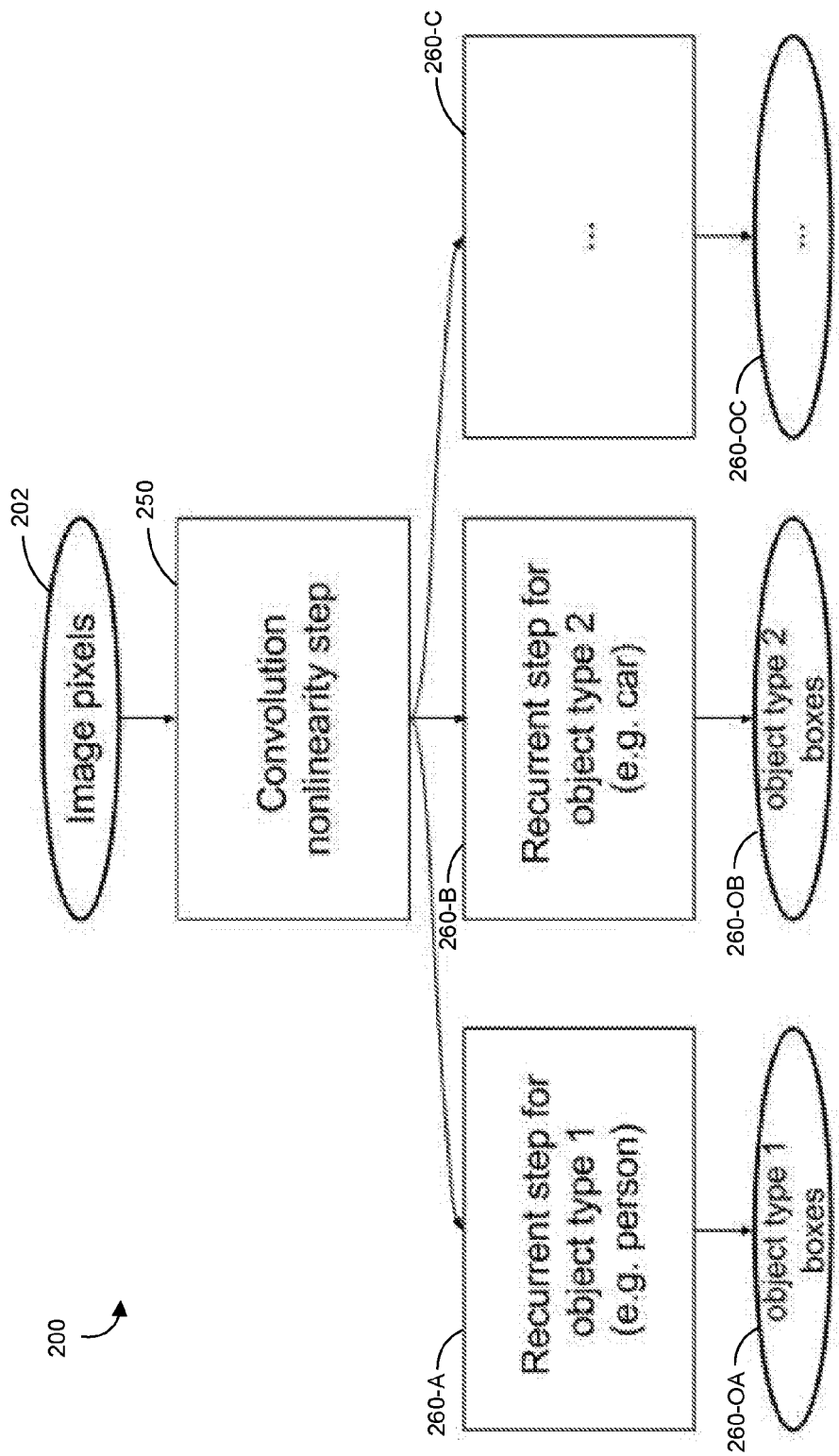
FIG. 2 illustrates another example of a neural network system that may detect multiple types of objects, in accordance with one or more embodiments.

In some embodiments, a neural network, such as neural network 100, may be able to detect multiple types of objects. Examples of the various types of objects that may be detected include, but are not limited to: people, faces, vehicles, trees, etc. In various embodiments, substantial sharing of parameters occurs between different layers. In some embodiments, some layers may share parameters between different types of objects, while other layers may have distinct sets of parameters for each type of object. FIG. 2 is an illustration of another example of a neural network 200 that may detect multiple types of objects, in accordance with one or more embodiments. Neural network 200 includes image pixels 202, convolution-nonlinearity step 250, recurrent step 260-A, recurrent step 260-B, recurrent step 260-C, output 260-OA, output 260-OB, and output 260-OC. In some embodiments, image pixels 202 may be input as third-order tensors into convolution-nonlinearity step 250, similar to image pixels 102 in FIG. 1A. In some embodiments, convolution-nonlinearity step 250 may be convolution-nonlinearity step 150 in FIG. 1A and comprise the same or similar computational layers. Parameter tensors within convolution-nonlinearity step 250 are shared between object types. For example, there is only one tensor $W^{(1)}_{nmab}$ used in a convolution layer, such as convolution layer 104-A, regardless of how many different types of objects are being detected by neural network 200.

The output of convolution-nonlinearity step 250 may be third-tensor output 112-OB in FIG. 1A. This output may then be converted to a first-order tensor, such as first-order tensor 114 in FIGS. 1A and 1B, and input into recurrent steps 260-A, 260-B, and 260-C. Each recurrent step 260-A, 260-B, and 260-C may comprise the same or similar computational layers as recurrent step 160 in FIG. 1B, and may output box data 260-OA, 260-OB, and 260-OC, respectively. Each output 260-OA, 260-OB, and 260-OC corresponds to one or more boxes that identify one type of object. For example, output 260-OA may comprise output boxes, such as outputs 124-OB, 126-OB, and 128-OB, which detect persons. Output 260-OB may comprise output boxes that detect cars. Output 260-OC may comprise output boxes that detect any other type of object. Parameter tensors are shared within each recurrent step, but are not shared between recurrent steps. For example, each quadratic recurrent layer of each recurrent step may include a tensor parameter $U_{mki}$, as described in FIG. 1B. There may be one tensor parameter, such as $U^{(person)}_{mki}$, used in a quadratic recurrent layer of a recurrent step 260-A, and another tensor parameter, such as $U^{(car)}{}_{mki}$, in a quadratic recurrent layer of recurrent step 260-B. All boxes output for predicted objects of interest that are people will be output by recurrent step 260-A, and all quadratic recurrent layers within recurrent step 260-A will share tensor parameter $U^{(person)}{}_{mki}$. All boxes output for predicted objects of interest that are cars will be output by recurrent step 260-B, and all quadratic recurrent layers within recurrent step 260-B will share tensor parameter $U^{(car)}{}_{mki}$. However, no quadratic recurrent layer in recurrent step 260-A will use tensor parameter $U^{(car)}{}_{mki}$ and no quadratic recurrent layer in recurrent step 260-B will use tensor parameter $U^{(person)}{}_{mki}$. This is true for all other parameter tensors within each recurrent step, such as $U_{mki}$ and $V_{nkj}$ used in quadratic recurrent layers, and $T_{ji}$ and $s_j$ used in linear layers.

In some embodiments, after the neural network has been sufficiently trained (using a threshold number of datasets), the neural network can then recognize new objects that the system has never encountered during training. In such embodiments, the new objects resemble or are in the same category as identified objects during the training phase. For example, if one identified object in the training sets is a car, then the neural network, in an inference mode, may detect a Ferrari as a car even if the neural network system has never seen a Ferrari before. This is because repeated passes of known input into the neural network trains the neural network to recognize different versions of the object as long as a threshold level of similarity exists. In some embodiments, such a threshold is determined by actual pixel value comparisons or image intensity differences. In some embodiments, such thresholds for determining whether a group of pixels in an image constitute an object are automatically set and/or inherently learned by the neural network system through training and not by humans setting threshold values.

Figure 3:
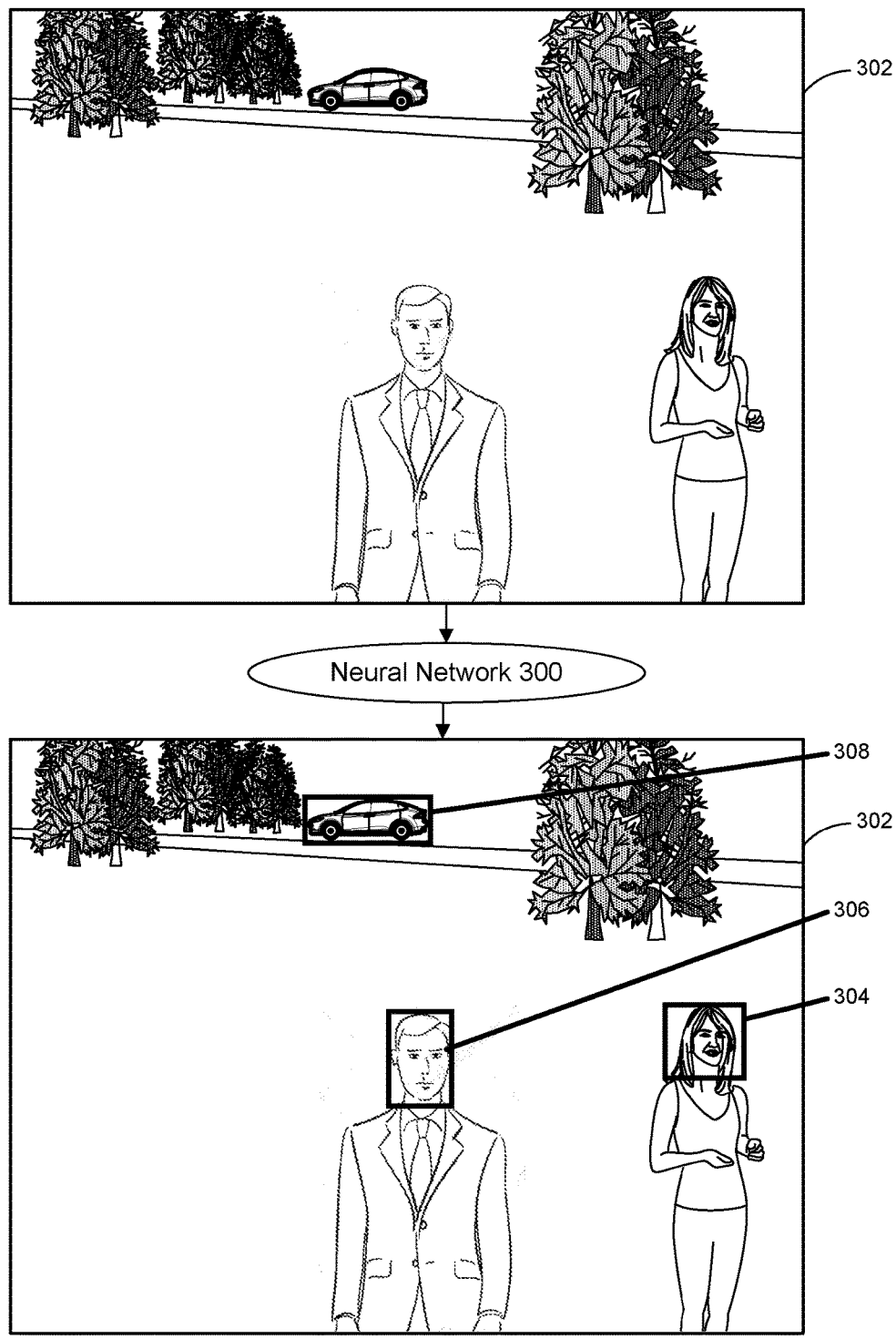
FIG. 3 illustrates an example of object recognition by a neural network in accordance with one or more embodiments.

FIG. 3 illustrates an example of output boxes around objects of interest generated by a neural network 300, in accordance with one or more embodiments. In some embodiments, neural network 300 may be a neural network such as neural network 100 or neural network 200, and may include the same or similar computational layers. According to various embodiments, the pixels of image 302 are input into neural network 300 as a third-order tensor, such as image pixels 102 or image pixels 202. Once the pixels of image 302 have been processed by the computational layers within neural network 300, neural network 300 outputs a first order tensor with five dimensions corresponding to the smallest bounding box around the object of interest, including the x and y coordinates of the center of the bounding box, the height of the bounding box, the width of the bounding box, and a probability that the bounding box is accurate. In some embodiments, neural network 300 is configured to detect the smallest possible bounding box around an identified object. In such embodiments, the smallest possible bounding box refers to the borders of the bounding box being a single pixel distance away from the top-most, bottom-most, left-most, and right-most pixels of the object of interest. In other words, the borders of a smallest possible bounding box include the pixels immediately adjacent to the pixels on the outer-most edges, relative to the center, of the object. As depicted in FIG. 3, neural network 300 has output boxes 304, 306, and 308. For purposes of illustration, boxes 304, 306, and 308 may not be drawn to scale. Thus, although boxes 304, 306, and 308 may represent smallest possible bounding boxes, for practical illustrative purposes, they are not literally depicted as such in FIG. 3. Boxes 304 and 306 each identify the face of a person and may be boxes from output 260-OA that is output by a single recurrent step, such as recurrent step 260-A. Box 308 identifies a car and may be a box from output 260-OB that is output by a separate recurrent step, such as recurrent step 260-B. In some embodiments, the borders of the output boxes are only a single pixel in thickness and are only thickened and enhanced, as with boxes 304, 306, and 308, when the output boxes have to be rendered in a display to a user, as shown in FIG. 3. In various embodiments, a neural network, such as neural networks 100, 200, and 300, may output boxes in both the training mode and the inference mode.

In training mode, the output boxes predicted by a neural network for an image may be compared to information of that image in a labeled dataset, which include the center location, height, and width of the smallest possible bounding box around each object of interest for that image. In some embodiments, the information is provided as pixel coordinates. For each predicted output box on an image, neural network 100 may compute the errors between the predicted output box's center, height, width, and probability and that of the labeled box's center, height, width, and probability in the dataset. The probability of each labeled box in an image of the labeled dataset will always be 1.0. The parameters within the computational layers of neural network 100 are then updated with a stochastic gradient descent algorithm combined with a standard back-propagation technique that slowly update the initial random values of the parameters such that neural network 100 outputs increasingly accurate center location, height, and width for the minimum bounding box around each object of interest within an image. The general equation for updating parameters within neural network 100 by stochastic gradient using the back-propagation algorithm is as follows: A parameter tensor, $W^{(n)}{}_{ij}$, may represent a second order tensor of parameters at some iteration (n) within the training mode. The gradient of the parameter tensor which may be computed using the algorithm's output box coordinates and the labeled box coordinates, is denoted as $\nabla W_{ij}{}^{(n)}$ (at the same iteration n). Then, the new parameters for the iteration (n+1) are computed as:

$$W_{ij}{}^{(n+1)} = W_{ij}{}^{(n)} - \alpha \nabla W_{ij}{}^{(n)}$$

where α is the learning rate, which is a scalar hyperparameter of the training mode algorithm. The specific value of α is application dependent. In some embodiments, the value of α may be 0.0005. The gradients mentioned above may be computed in the standard manner for stochastic gradient descent. In a further embodiment, neural network 100 may be implemented in a system of training a neural network to detect objects of interest utilizing data augmentation and data generation algorithms In some embodiments, this process is used to train neural network 100 until the predictions for new images no longer improve. In other embodiments, this process may be used to train neural network 100 until neural network 100 is deemed sufficiently trained. In some embodiments, determining when neural network 100 is sufficiently trained includes withholding a subset of images of the labeled dataset. Throughout the training mode, an image from the withheld subset is periodically inputted into neural network 100 to determine the accuracy of predicted output boxes for that image. Once neural network 100 consistently identifies objects at a predefined threshold accuracy on the subset of images, neural network may be deemed sufficiently trained. In various embodiments, the specific value of the predefined threshold may vary and may be dependent on various applications. For example, for the application of drone control for following objects of interest, a threshold of 90% accuracy may be used. Once neural network 100 is deemed to be sufficiently trained, neural network 100 may be used to perform predictions in the inference mode. Neural network 100 may output boxes on predicted objects of interest on new images which are unlabeled.

Once sufficiently trained, neural network 100 may recognize new objects corresponding to categories of objects it has been trained on. For example, neural network 100 may identify a car it that it was never exposed to during the training mode. It may identify such car based on other similar objects in corresponding categories of the labeled dataset. In some embodiments, pixel intensity may be used for this identification. For example, the image intensity difference between the object in the image and one or more objects in the labeled dataset may be calculated to determine if the object in the image matches objects from a particular category in the labeled dataset. In some embodiments, an error or difference for each color channel is calculated between each corresponding pixel in the two frames. Then an average error of the RGB value of all color channels is derived for each pixel. Next, the average error for all pixels within the first and second frames is calculated. In some embodiments, the image intensity difference between two objects will be a value between 0 and 255. A lower image intensity difference value corresponds to a closer image match between the objects.

In some embodiments, a threshold value for pixel intensity may be used to determine a match. In various embodiments, the threshold values are not provided by human input, but instead are inherently learned by neural network 100 through training. In other embodiments, other methods may be used to identify unknown objects, such as by comparing tensor values.

According to various embodiments, neural network 100 may be used for real-time detection on a sequence of images from a streaming video. As used herein, "real-time" is defined as running at a sufficient frame-rate such that a human does not perceive any interruption or "choppiness" between images in a video feed. The human visual system has been measured to process approximately ten to twelve separate images per second such that it perceives each image individually. In an embodiment, neural network 100 may be able to process images at a rate of approximately 25 frames-per-second, which may appear as a fluid video stream. In other embodiments, a neural network my obtain image inputs from any type of video recording device, such as a smartphone. In further embodiments, neural network may be implemented in a system for tracking objects of interest, calculating relative distances of objects of interests, and drone control for following objects of interest. In yet further embodiments, neural network 100 may be implemented in a system for gesture recognition and virtual reality rendering.

Figure 4:
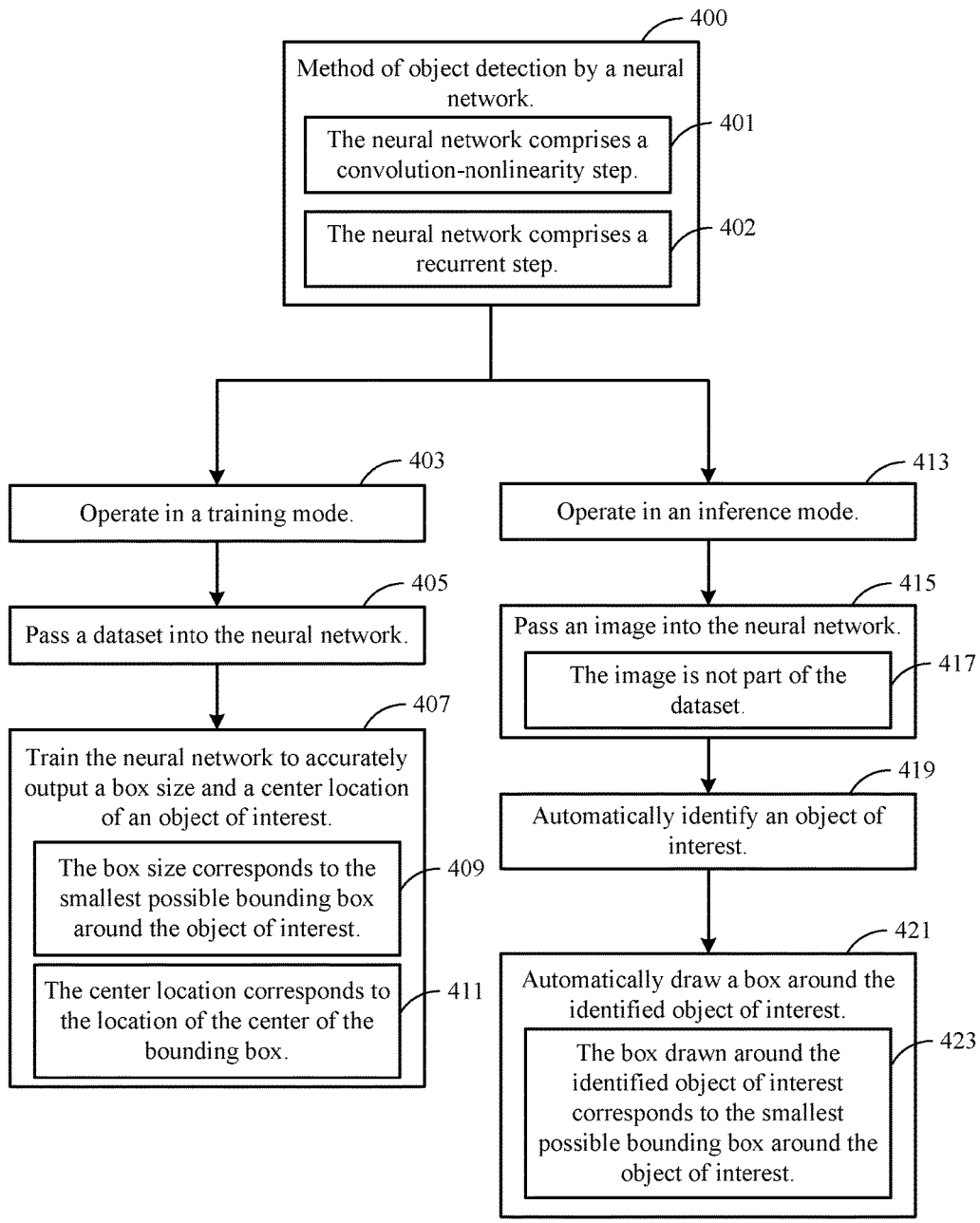
FIG. 4 illustrates an example of a method for object detection by a neural network, in accordance with one or more embodiments.

FIG. 4 illustrates an example of a method 400 for object detection by a neural network, in accordance with one or more embodiments. In certain embodiments, the neural network may be neural network 100. Neural network 100 may comprise a convolution-nonlinearity step 401 and a recurrent step 402. In some embodiments convolution-nonlinearity step 401 may be convolution-nonlinearity step 150 with the same or similar computational layers. In some embodiments, recurrent step 402 may be recurrent step 160 with the same or similar computational layers. In other embodiments, neural network 100 may comprise multiple recurrent steps 402, such as recurrent steps 260-A, 260-B, and 260-C in neural network 200. Neural network 100 may operate in a training mode 403 and an inference mode 413.

When operating in the training mode 403, neural network 100 passes a dataset into neural network at 405. In some embodiments, the dataset may comprise a plurality of images with known identified objects of interest. In further embodiments, the images of the dataset may be labeled with the information including the center location, height, and width of the smallest possible bounding box around each known identified object of interest for that image. In some embodiments, passing the dataset into the neural network may comprise inputting the pixels of each image, such as image pixels 102, in the dataset as third-order tensors into a plurality of computational layers, such as those described in FIGS. 1A and 1B. In some embodiments, the computational layers may be layers within convolution-nonlinearity step 401 or 150, such as convolution layer 104-A and rectified linear layer 104-B. In some embodiments, the computational layers may comprise convolution-nonlinearity layer pairs, such as convolution-nonlinearity layer pair 104, 106, 108, 110, and 112. In some embodiments, the computational layers of convolution-nonlinearity step 401 transform the input pixels into features comprising high-dimensional vector representations that are utilized in object detection. In some embodiments, the output of convolution-nonlinearity step 401 is input into further computational layers within recurrent step 402 or 160, such as quadratic recurrent layer 124-A and linear layer 124-B. In some embodiments, the computational layers in recurrent step 402 may comprise recurrent layer pairs, such as recurrent layer pair 124, 126, and 128. In some embodiments, the computational layers of recurrent step 402 translate the high-dimensional vector representation features into output boxes for predicted objects of interest in the image identified by neural network 100. In some embodiments, neural network 100 may continue to output boxes for predicted objects of interest until the probability that the box is accurate is less than a predetermined threshold probability. In some embodiments, the predetermined threshold probability may be 0.5.

At 407, neural network 100 is trained to accurately output a box size 409 and a center location 411 of an object of interest. In some embodiments, box size 409 corresponds to the smallest possible bounding box around the object of interest. In some embodiments, center location 411 corresponds to the location of the center of the bounding box. In some embodiments, training neural network 100 includes comparing the predicted output boxes to the information labeled in the dataset and computing the errors by between the predicted output boxes and the labeled information. Training neural network 100 may further include updating the parameters within the computational layers of convolution-nonlinearity step 401 and recurrent step 402 with a stochastic gradient descent algorithm combined with a standard back-propagation technique that slowly change the initial random values of the parameters such that neural network 100 outputs increasingly accurate center location, height, and width for the minimum bounding box around each object of interest within an image. In some embodiments, neural network is trained until neural network 100 is determined to be sufficiently trained. In some embodiments, a subset of labeled images within the dataset are withheld and input into neural network 100 to determine the accuracy of predicted output boxes for that image. Once neural network achieves a predefined threshold accuracy on the subset of images, neural network may be deemed sufficiently trained. In various embodiments, the specific value of the predefined threshold may vary and may be dependent on various applications.

Once neural network 100 is deemed to be sufficiently trained, neural network 100 may be used to perform predictions in the inference mode 413. When operating in the inference mode 413, an image 417 is passed into the neural network at 415. The image 417 is not part of the dataset from step 405. In some embodiments, the pixels of image 417 are input into neural network 100 as third-order tensors, such as image pixels 102. In some embodiments, the image pixels are input into a plurality of computational layers within convolution-nonlinearity step 401 and recurrent step 402 as described in step 405.

The computational layers of neural network 100 transform the tensor inputs to automatically identify an object of interest at 419. As previously described, the computational layers of convolution-nonlinearity step 401 transform the input pixels into features comprising high-dimensional vector representations that are utilize in object detection. At step 421, a box 423 is automatically drawn around each object of interest identified by neural network 100. The box 423 drawn around the identified object of interest corresponds to the smallest possible bounding box around the object of interest. As previously described, the computational layers of recurrent step 402 translate the high-dimensional vector representation features into output boxes for predicted objects of interest in the image identified by neural network 100. In some embodiments, neural network 100 may continue to output boxes for predicted objects of interest until the probability that the box is accurate is less than 0.5, as in training mode 403.

Figure 5A:
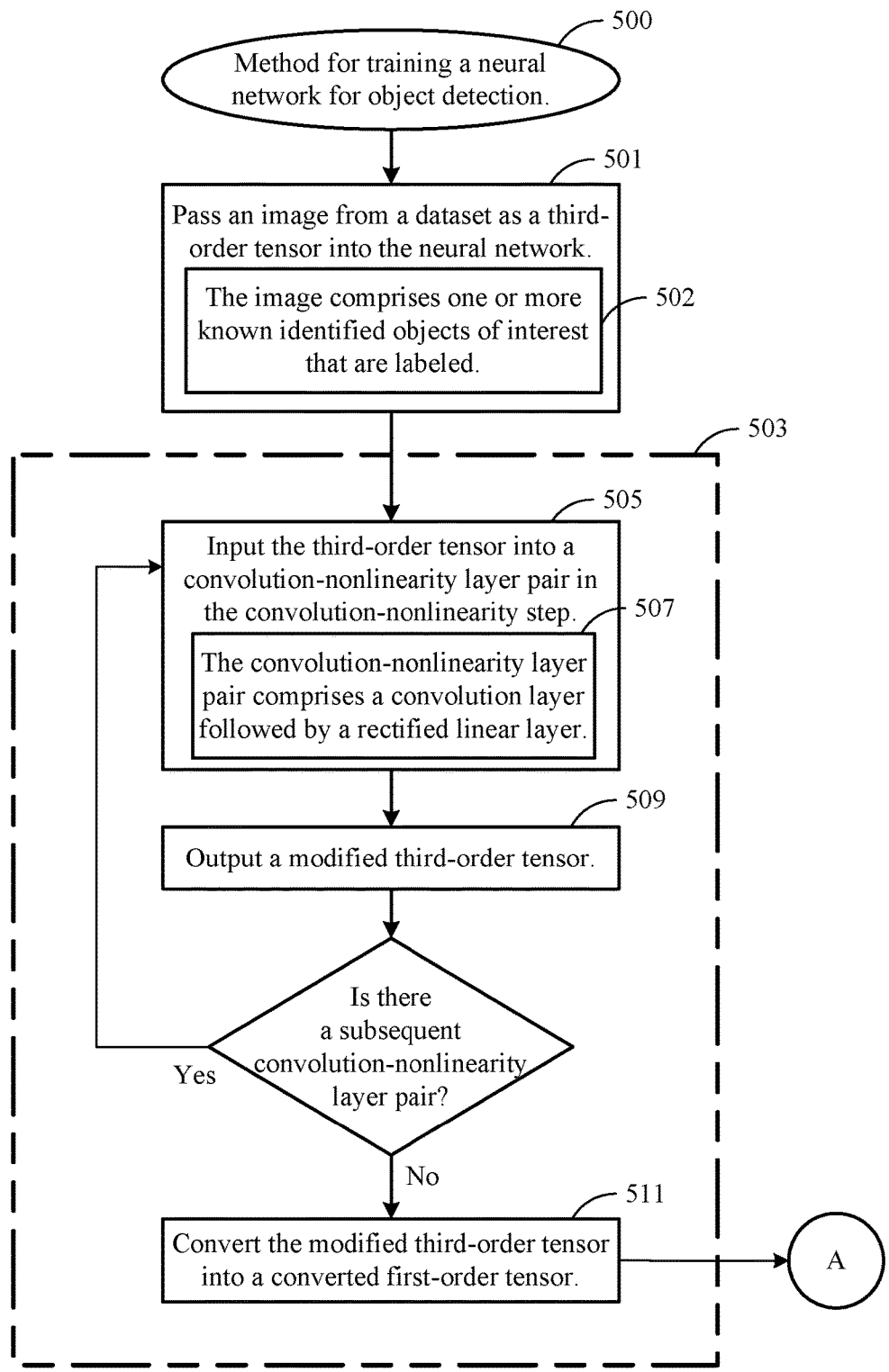
FIG. 5A illustrates an example of a convolution-nonlinearity step in a method for training a neural network to detect objects of interest in accordance with one or more embodiments.
Figure 5B:
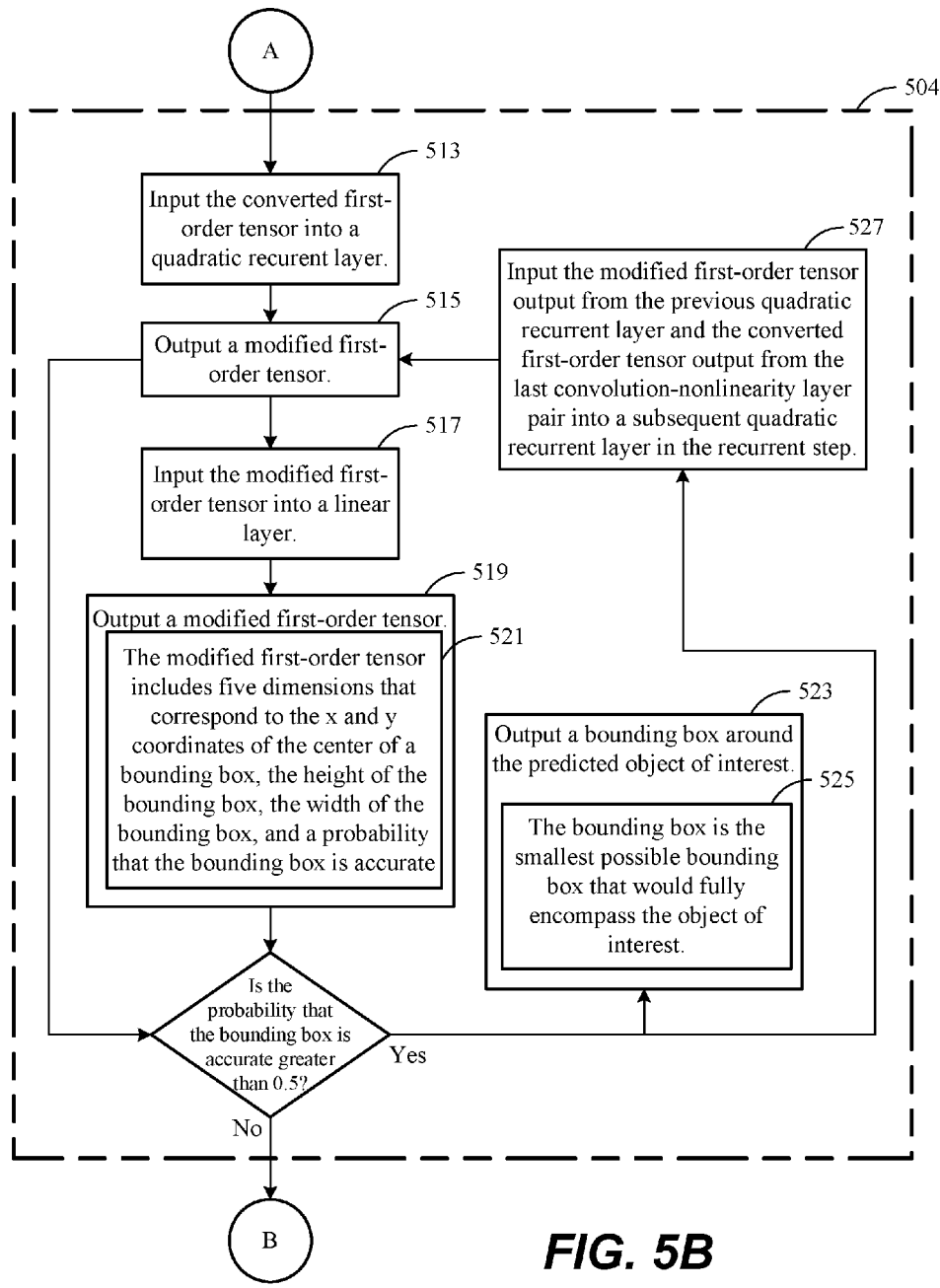
FIG. 5B illustrates an example of a recurrent step in the method for training a neural network to detect objects of interest in accordance with one or more embodiments.
Figure 5C:
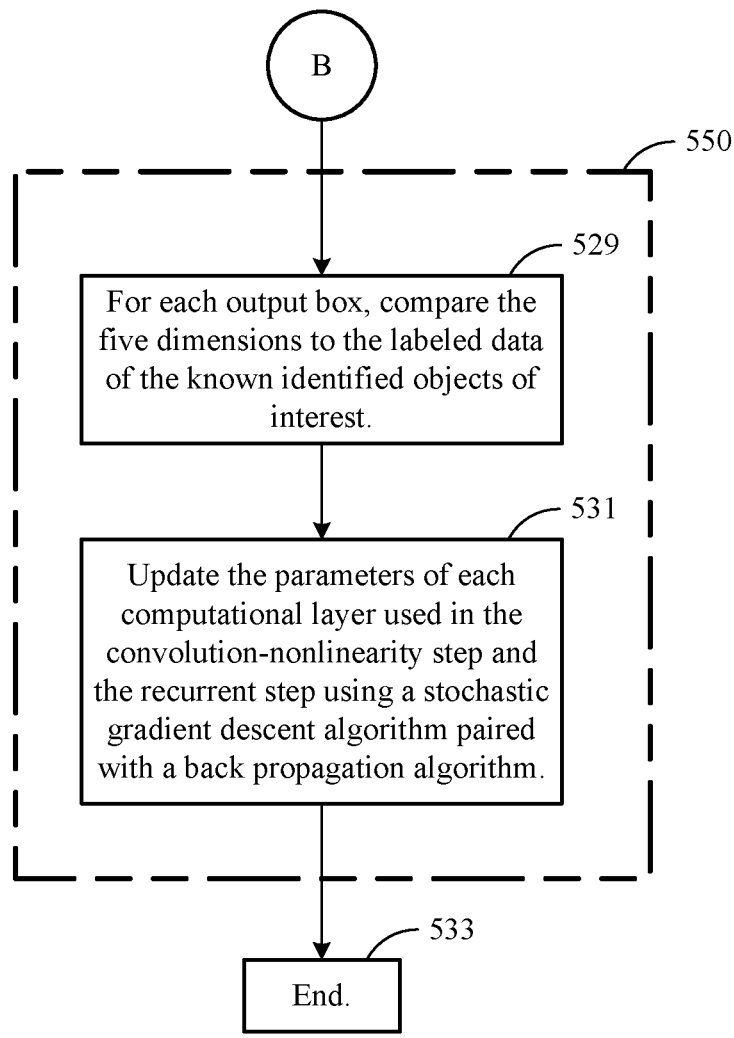
FIG. 5C illustrates an example of a training step in the method for training a neural network to detect objects of interest in accordance with one or more embodiments.

FIGS. 5A, 5B, and 5C illustrate an example of a method 500 for training a neural network to detect objects of interest in accordance with one or more embodiments. FIG. 5A illustrates an example of a convolution-nonlinearity step in method 500. FIG. 5B illustrates an example of a recurrent step in method 500. FIG. 5C illustrates an example of a training step of method 500. According to various embodiments, an image 502 is passed from a dataset as a third-order tensor into the neural network at 501. In some embodiments, the neural network may be neural network 100. In some embodiments, image 502 may be one image 502 in a dataset comprising multiple images 502. In some embodiments, image 502 may be image pixels 102. In some embodiments, image 502 includes one or more known identified objects of interest that are labeled. In some embodiments, image 502 is labeled with information including the center location, height, and width of the smallest possible bounding box around each object of interest for that image. In some embodiments, the labeled information is stored in the dataset. In some embodiments, neural network may comprise a convolution-nonlinearity step 503, a recurrent step 504, and a training step 550. In some embodiments, convolution-nonlinearity step 503 may be convolution-nonlinearity step 150 and may include the same or similar computational layers as described in FIG. 1A. In some embodiments, recurrent step 504 may be recurrent step 160 and may include the same or similar computational layers as described in FIG. 1B.

At 505, the third-order tensor is input into a convolution-nonlinearity layer pair 507 in the convolution-nonlinearity step 503. In some embodiments, convolution-nonlinearity layer pair 507 may be convolution-nonlinearity layer pair 104 and may comprise a convolution layer, such as convolution layer 104-A, followed by a rectified linear layer, such as rectified linear layer 104-B. At 509, a modified third-order tensor is output by convolution-nonlinearity layer pair 507.

In some embodiments, the modified third-order tensor may be input into a subsequent convolution-nonlinearity layer pair 507 which outputs a further modified third-order tensor, repeating steps 505 and 509. If there is a subsequent convolution-nonlinearity layer pair 507 within convolution-nonlinearity step 503, then the modified third-order tensor output from step 509 is input into the subsequent convolution-nonlinearity layer pair 507 at 505. In some embodiments, the subsequent convolution-nonlinearity layer pair 507 may be convolution-nonlinearity layer pairs 106, 108, 110, and 112. In various embodiments, convolution-nonlinearity step 503 may comprise any number of convolution-nonlinearity layer pairs 507. In some embodiments, the convolution-nonlinearity layer pairs 507 within convolution-nonlinearity step 503 transform the input tensor into features comprising high-dimensional vector representations that may be utilized in object detection. The more convolution-nonlinearity layer pairs 507 that are utilized, the better conditioned for the task of object detection each output modified third-order tensor will be at 509. However, with more convolution-nonlinearity layer pairs 507, more labeled images may be required to train neural network 100 to a desired accuracy. Additionally, more computational time may be required to input tensors through more convolution-nonlinearity layer pairs 507. Once there are no more subsequent convolution-nonlinearity layer pairs 507, a final modified third-order tensor is output at 509. At 511, neural network 100 converts the final modified third-order tensor into a converted first-order tensor. In various embodiments, a higher order tensor, such as a third order tensor, may be converted to a lower order tensor as all the dimensions can be combined into a single dimension. For example, all values in a third-order tensor may be listed in a singular vector form.

At 513, the converted first-order tensor enters recurrent step 504, shown in FIG. 5B, where the converted first-order tensor is input into a quadratic recurrent layer. In some embodiments, the quadratic recurrent layer may be quadratic recurrent layer 124-A. A modified first-order tensor 515 is output by the quadratic recurrent layer. In some embodiments, the modified first-order tensor may be output 124-OA. At 517, neural network 100 inputs the modified first-order tensor 124-OA into a linear layer. In some embodiments, the linear layer may be linear layer 124-B. In various embodiments, recurrent step 504 may comprise one or more recurrent layer pairs, such as recurrent layer pair 124, which include a quadratic recurrent layer, such as 124-A, and a linear layer, such as 124-B. At 519, the linear layer outputs a modified first-order tensor. In some embodiments, the modified first order tensor may be output 124-OB. In some embodiments, modified first-order tensor 124-OB may include five dimensions 521 that correspond to the x and y coordinates of the center of a bounding box 525, the height of the bounding box 525, the width of the bounding box 525, and a probability that the bounding box 525 is accurate.

If modified first-order tensor 124-OB indicates that the probability that the bounding box is accurate is greater than or equal to 0.5 then neural network 100 will output a bounding box 525 around the predicted object of interest at 523. The bounding box 525 may be sized and located based on the dimensions 521 contained in first-order tensor 124-OB. In some embodiments, bounding box 525 is the smallest possible bounding box that would fully encompass the object of interest. Additionally, neural network 100 begins identifying a second predicted object by inputting the modified first-order tensor 124-OA output from the previous quadratic recurrent layer (step 515) and the converted first order tensor output from the last convolution-nonlinearity layer pair (step 511) into a subsequent quadratic recurrent layer at 527 to repeat steps 515 to 521. In some embodiments, the subsequent quadratic recurrent layer may be quadratic recurrent layer 126-A. At 515, the subsequent quadratic recurrent layer 126-A outputs another modified first-order tensor, such as output 126-OA. The neural network goes through steps 517 and 519 again to output a modified first-order tensor, such as output 126-OB with five dimensions 521. If the probability within dimensions 521 of output 126-OB is greater than or equal to 0.5, neural network 100 will repeat step 523 to output a bounding box 525 around a second predicted object of interest. Neural network 100 will also repeat step 527 to identify a third predicted object of interest. Steps 515, 517, 519, 523 and 527 will be repeated by neural network 100 until the modified first-order tensor at output at step 519 indicates that the probability that the bounding box is accurate is less than 0.5.

If, on the other hand, dimensions 521 of modified first-order tensor 126-OB indicate that the probability is less than 0.5, neural network 100 will not output a bounding box 525 around the second predicted object of interest and cease outputting any more bounding boxes 525 onto the image. Furthermore, modified-first order tensor 126-OA output by the previous quadratic recurrent layer 126-A in step 515 will not be input into a subsequent quadratic recurrent layer at 527.

In some embodiments, neural network 100 implements recurrent step 504 for each object type, such as people, cars, faces, trees, etc. For example, a recurrent step 504 may be recurrent step 260-A which outputs boxes 260-OA for all predicted objects of interest that are people. Another recurrent step 504 may be recurrent step 260-B which outputs boxes 260-OB for all predicted objects of interest that are cars. All quadratic recurrent layers within recurrent step 260-A may share tensor parameters, such as tensor parameter $U^{(person)}_{mki}$. All quadratic recurrent layers within recurrent step 260-B may share tensor parameters, such as tensor parameter $U^{(car)}_{mki}$. In some embodiments, neural network 100 implements one convolution-nonlinearity step 503 for all predicted objects of interest, and all computational layers within convolution-nonlinearity step 503 may share tensor parameters.

Once neural network 100 has identified all predicted objects of interest of all types and output bounding boxes 525 for each predicted object of interest, neural network 100 begins training step 550 (shown in FIG. 5C) to train the parameters of each computational layer used in convolution-nonlinearity step 502 and recurrent step 504. At 529, neural network 100 compares the five dimensions of each output box 525 to the labeled data of the known identified objects of interest within image 502. Neural network 100 calculates any errors and then updates the parameters of each computational layer used in convolution-nonlinearity step 503 and recurrent step 504 by using a stochastic gradient descent algorithm paired with a back propagation algorithm at 531.

Method 500 ends at 533 for the current image 502 input into the neural network and a subsequent image 502 from the labeled dataset is passed into neural network 100 at 501 to be used to train the parameters of neural network 100. In some embodiments, neural network 100 may implement method 500 for each labeled image 502 in the dataset until the predictions indicated by dimensions 521 no longer improve. In other embodiments, neural network 100 may implement method 500 for labeled images 502 in the dataset until neural network 100 consistently identifies objects in each image at a predetermined accuracy threshold. As previously described, in some embodiments, a subset of images 502 are withheld and not passed into neural network 100. At any point in the training of neural network 100, a withheld image 502 from the withheld subset may be passed into neural network 100 at 501 to determine the accuracy of predicted output boxes 525 for the withheld image 502. Once neural network 100 achieves a predefined threshold accuracy on the subset of images, neural network may be deemed sufficiently trained. In various embodiments, the specific value of the predefined threshold may vary and may be dependent on various applications. For example, for the application of drone control for following objects of interest, a threshold of 90% accuracy may be desired. This means that once neural network 100 can consistently identify 90% or more of the objects within a given image, neural network 100 may be deemed sufficiently trained. Neural network 100 may then be used to output boxes on predicted objects of interest on new unlabeled images 502 in the inference mode by implementing method 600 as will be described below.

Figure 6A:
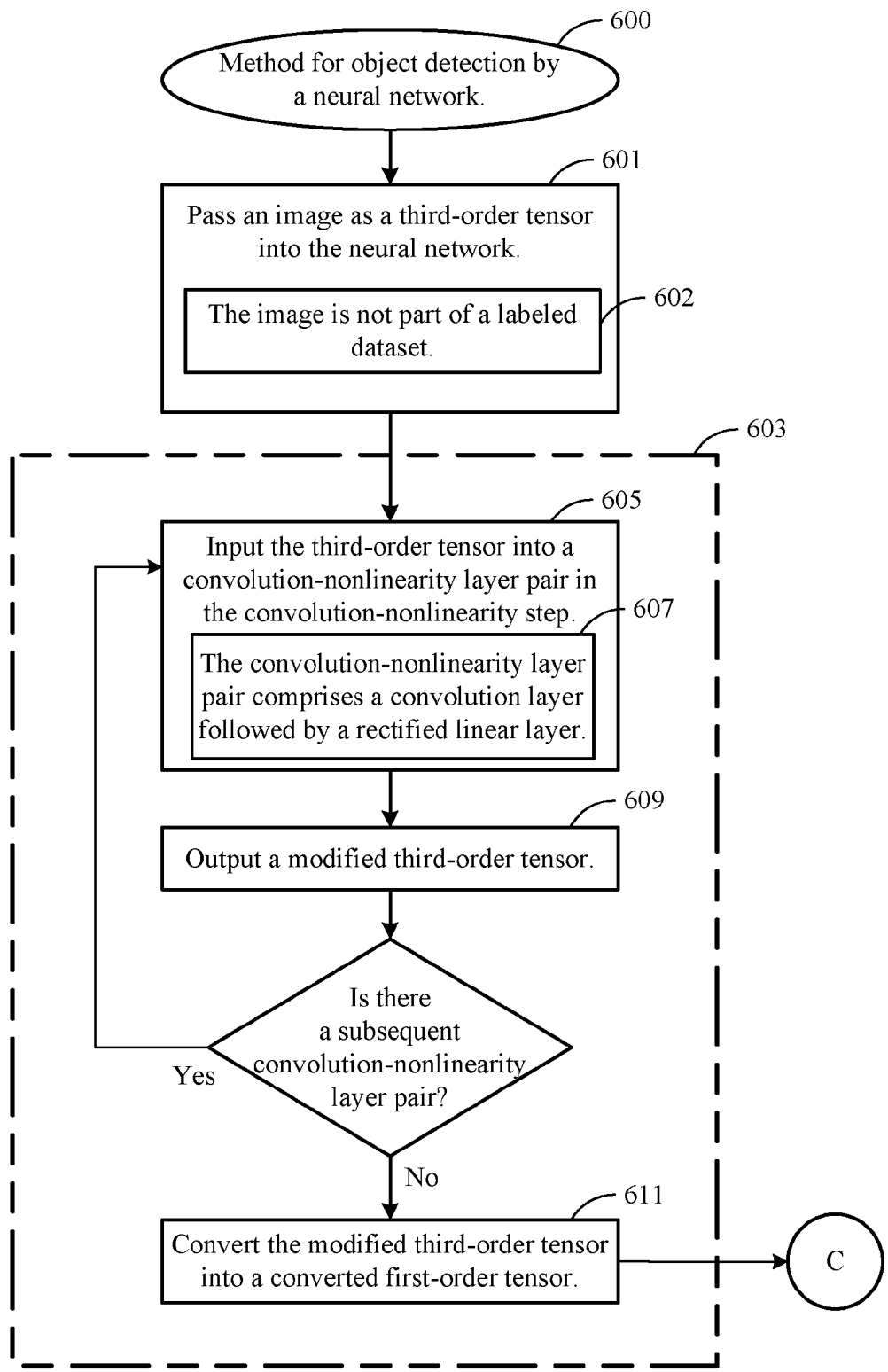
FIG. 6A illustrates an example of a convolution-nonlinearity step in a method for object detection by a neural network to detect objects of interest in accordance with one or more embodiments.
Figure 6B:
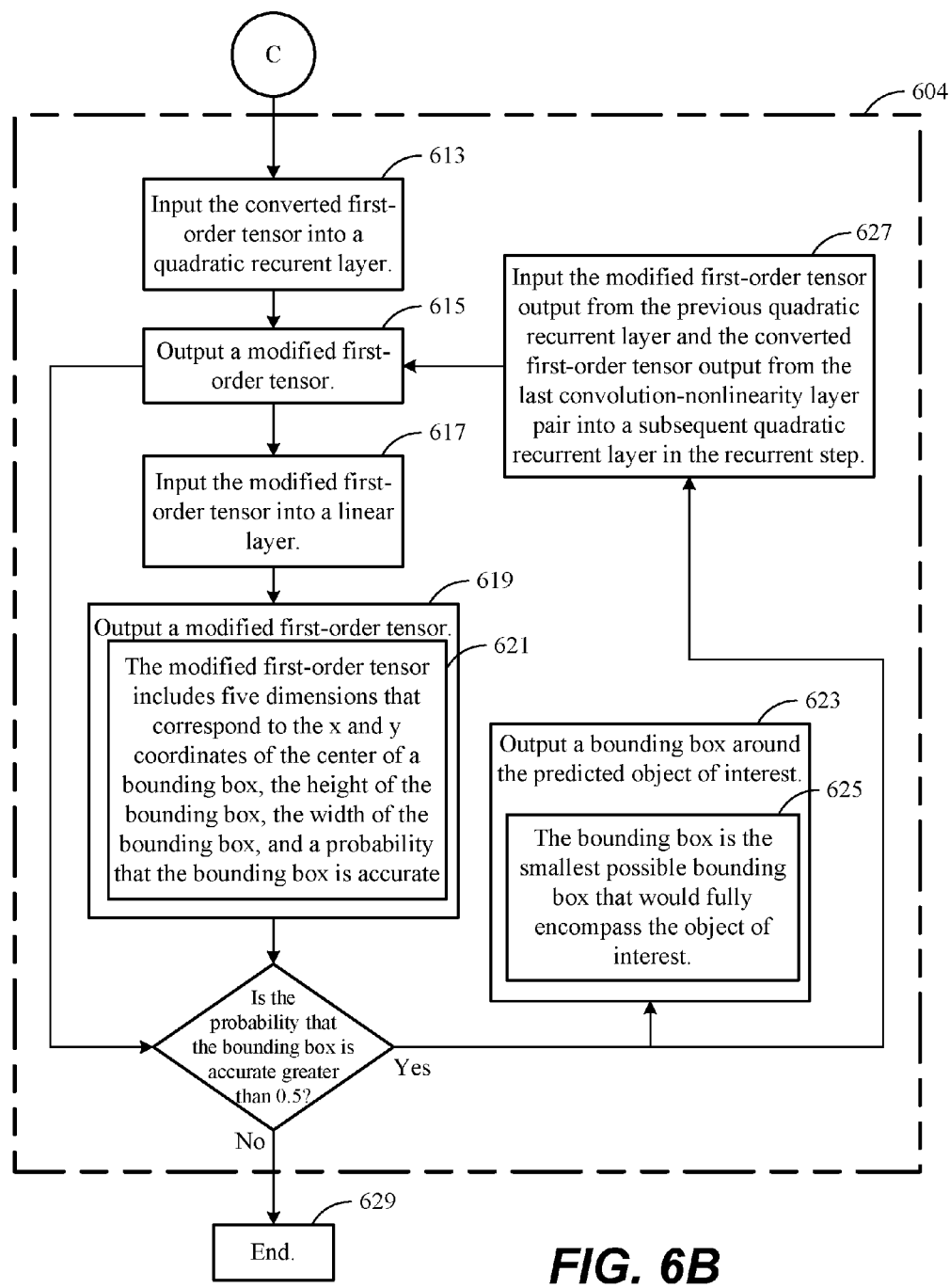
FIG. 6B illustrates an example of a recurrent step in a method for object detection by a neural network to detect objects of interest in accordance with one or more embodiments.

FIGS. 6A and 6B illustrates an example of a method 600 for object detection by a neural network, in accordance with one or more embodiments. FIG. 6A illustrates an example of a convolution-nonlinearity step in method 600. FIG. 6B illustrates an example of a recurrent step in method 600. According to various embodiments, an image 602 is passed from a dataset as a third-order tensor into the neural network at 601. In some embodiments, the neural network may be neural network 100. In various embodiments, method 600 may be implemented as the inference mode of neural network 100. In some embodiments, image 602 may be image pixels 102. In some embodiments, image 602 is not part of a labeled dataset which contain information for one or more known identified objects of interest that are labeled. In some embodiments image 602, unlike image 502, is not labeled with information including the center location, height, and width of the smallest possible bounding box around each object of interest for that image 602. In some embodiments, neural network may comprise a convolution-nonlinearity step 603 and a recurrent step 604. In some embodiments, convolution-nonlinearity step 603 may be convolution-nonlinearity step 150 and may include the same or similar computational layers as described in FIG. 1A. In some embodiments, recurrent step 604 may be recurrent step 160 and may include the same or similar computational layers as described in FIG. 1B.

At 605, the third-order tensor is input into a convolution-nonlinearity layer pair 607 in the convolution-nonlinearity step 603. In some embodiments, convolution-nonlinearity layer pair 607 may be convolution-nonlinearity layer pair 104 and may comprise a convolution layer, such as convolution layer 104-A, followed by a rectified linear layer, such as rectified linear layer 104-B. At 609, a modified third-order tensor is output by convolution-nonlinearity layer pair 607.

In some embodiments, the modified third-order tensor may be input into a subsequent convolution-nonlinearity layer pair 607 which outputs a further modified third-order tensor, repeating steps 605 and 609. If there is a subsequent convolution-nonlinearity layer pair 607 within convolution-nonlinearity step 603, then the modified third-order tensor output from step 609 is input into the subsequent convolution-nonlinearity layer pair 607 at 605. In some embodiments, the subsequent convolution-nonlinearity layer pair 607 may be convolution-nonlinearity layer pairs 106, 108, 110, and 112. In various embodiments, convolution-nonlinearity step 603 may comprise any number of convolution-nonlinearity layer pairs 607. In some embodiments, the convolution-nonlinearity layer pairs 607 within convolution-nonlinearity step 603 transform the input tensor into features comprising high-dimensional vector representations that may be utilized in object detection. The more convolution-nonlinearity layer pairs 607 that are utilized, the better conditioned for the task of object detection each output modified third-order tensor will be at 609. However, more computational time may be required to input tensors through more convolution-nonlinearity layer pairs 607. Once there are no more subsequent convolution-nonlinearity layer pairs 607, a final modified third-order tensor is output at 609. At 611, neural network 100 converts the final modified third-order tensor into a converted first-order tensor. In various embodiments, a higher order tensor, such as a third order tensor, may be converted to a lower order tensor as all the dimensions can be combined into a single dimension. For example, all values in a third-order tensor may be listed in a singular vector form.

At 613, the converted first-order tensor enters recurrent step 604, shown in FIG. 6B, where the converted first-order tensor is input into a quadratic recurrent layer. In some embodiments, the quadratic recurrent layer may be quadratic recurrent layer 124-A. A modified first-order tensor 615 is output by the quadratic recurrent layer. In some embodiments, the modified first-order tensor may be output 124-OA. At 617, neural network 100 inputs the modified first-order tensor 124-OA into a linear layer. In some embodiments, the linear layer may be linear layer 124-B. In various embodiments, recurrent step 604 may comprise one or more recurrent layer pairs, such as recurrent layer pair 124, which include a quadratic recurrent layer, such as 124-A, and a linear layer, such as 124-B. At 619, the linear layer outputs a modified first-order tensor. In some embodiments, the modified first order tensor may be output 124-OB. In some embodiments, modified first-order tensor 124-OB may include five dimensions 621 that correspond to the x and y coordinates of the center of a bounding box 625, the height of the bounding box 625, the width of the bounding box 625, and a probability that the bounding box 625 is accurate.

If modified first-order tensor 124-OB indicates that the probability that the bounding box is accurate is greater than or equal to 0.5 then neural network 100 will output a bounding box 625 around the predicted object of interest at 623. The bounding box 625 may be sized and located based on the dimensions 621 contained in first-order tensor 124-OB. In some embodiments, bounding box 625 is the smallest possible bounding box that would fully encompass the object of interest. Additionally, neural network 100 begins identifying a second predicted object by inputting the modified first-order tensor 124-OA output from the previous quadratic recurrent layer (step 615) and the converted first order tensor output from the last convolution-nonlinearity layer pair (step 611) into a subsequent quadratic recurrent layer at 627 to repeat steps 615 to 621. In some embodiments, the subsequent quadratic recurrent layer may be quadratic recurrent layer 126-A. At 615, the subsequent quadratic recurrent layer 126-A outputs another modified first-order tensor, such as output 126-OA. The neural network goes through steps 617 and 619 again to output a modified first-order tensor, such as output 126-OB with five dimensions 621. If the probability within dimensions 621 of output 126-OB is greater than or equal to 0.5, neural network 100 will repeat step 623 to output a bounding box 625 around a second predicted object of interest. Neural network 100 will also repeat step 627 to identify a third predicted object of interest. Steps 615, 617, 619, 623 and 627 will be repeated by neural network 100 until the modified first-order tensor at output at step 619 indicates that the probability that the bounding box is accurate is less than 0.5.

In some embodiments, neural network 100 implements recurrent step 604 for each object type, such as people, cars, faces, trees, etc. For example, a recurrent step 604 may be recurrent step 260-A which outputs boxes 260-OA for all predicted objects of interest that are people. Another recurrent step 604 may be recurrent step 260-B which outputs boxes 260-OB for all predicted objects of interest that are cars. All quadratic recurrent layers within recurrent step 260-A may share tensor parameters, such as tensor parameter $U^{(person)}_{mki}$. All quadratic recurrent layers within recurrent step 260-B may share tensor parameters, such as tensor parameter $U^{car}_{mki}$. In some embodiments, neural network 100 implements one convolution-nonlinearity step 603 for all predicted objects of interest, and all computational layers within convolution-nonlinearity step 603 may share tensor parameters.

If, on the other hand, dimensions 621 of modified first-order tensor 126-OB indicate that the probability is less than 0.5, neural network 100 will not output a bounding box 625 around the second predicted object of interest and cease outputting any more bounding boxes 625 onto the image. Furthermore, modified-first order tensor 126-OA output by the previous quadratic recurrent layer 126-A in step 615 will not be input into a subsequent quadratic recurrent layer at 627. Method 600 ends at 629 for the current image 602 input into the neural network and a subsequent image 602 is passed into neural network 100 at 601 to have possible objects predicted and identified by neural network 100. According to various embodiments, neural network 100 may implement method 600 to detect objects in a sequence of images in real-time. For example, neural network 100 may be configured to process images at a rate of approximately 25 frames-per-second, which may appear as a fluid video stream.

Figure 7:
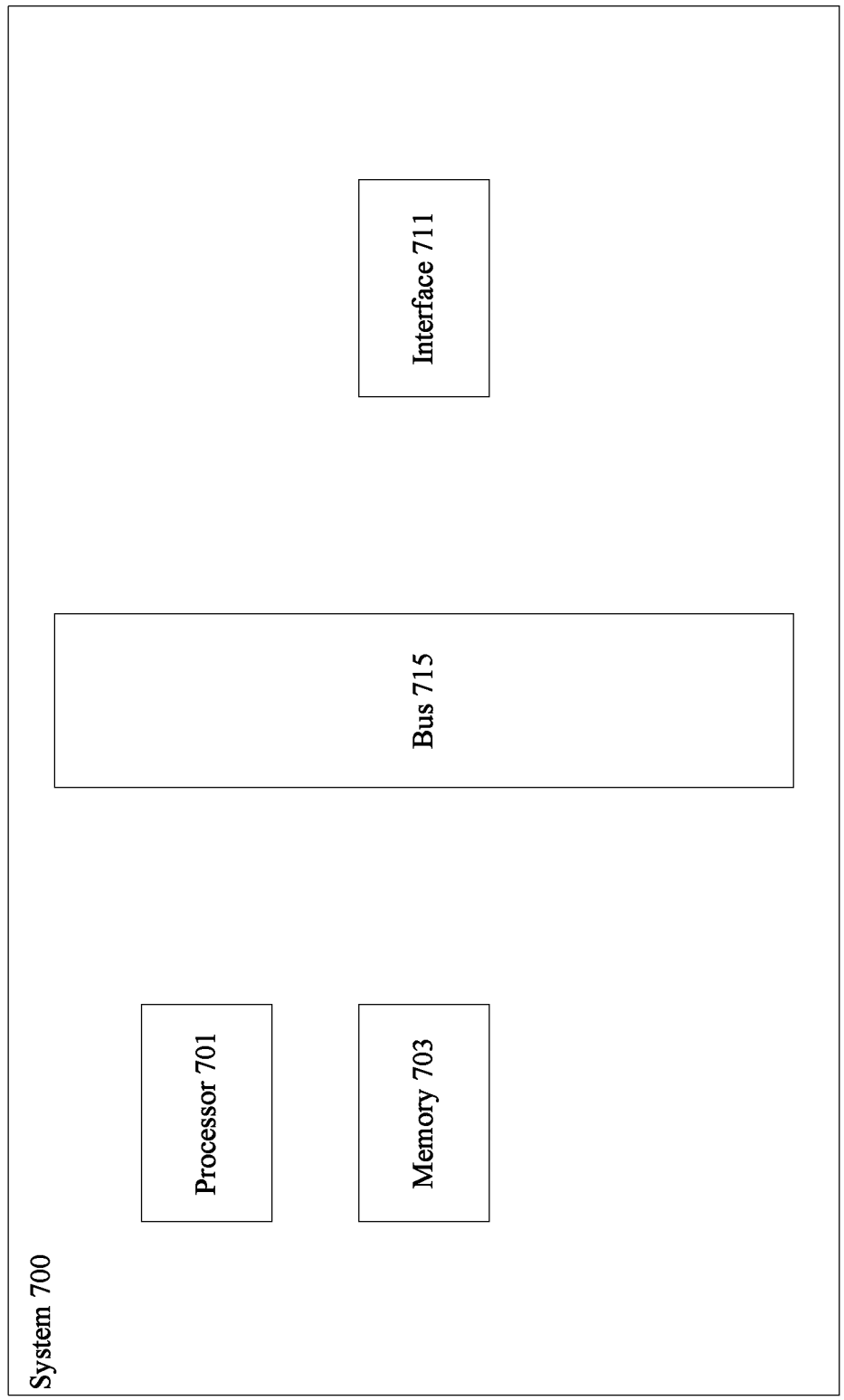
FIG. 7 illustrates one example of a neural network system that can be used in conjunction with the techniques and mechanisms of the present disclosure in accordance with one or more embodiments.

FIG. 7 illustrates one example of a neural network system 700, in accordance with one or more embodiments. According to particular embodiments, a system 700, suitable for implementing particular embodiments of the present disclosure, includes a processor 701, a memory 703, an interface 711, and a bus 715 (e.g., a PCI bus or other interconnection fabric) and operates as a streaming server. In some embodiments, when acting under the control of appropriate software or firmware, the processor 701 is responsible for processing inputs through various computational layers and algorithms, such as convolution layer 104-A, rectified linear layer 104-B, quadratic recurrent layer 124-A, linear layer 124-B, and other computational layers in convolution-nonlinearity step 150 and recurrent step 160. In other embodiments, the processor is responsible for updating the parameters of each computational layer within the convolution-linearity step 150 and recurrent step 160 using algorithms including a stochastic gradient descent algorithm and a back propagation algorithm. Various specially configured devices can also be used in place of a processor 701 or in addition to processor 701. The interface 711 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media.

In some cases, they may also include an independent processor and, in some instances, volatile RAM. The independent processors may control such communications intensive tasks as packet switching, media control and management.

According to particular example embodiments, the system 700 uses memory 703 to store data and program instructions for operations including training a neural network, such as method 500, and object detection by a neural network, such as method 600. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A method for object detection using a neural network, the method comprising:
    in a training mode:
        passing a dataset into the neural network; and
        training the neural network to accurately output a box size and a center location of a first object of interest, wherein the box size corresponds to the smallest possible bounding box around the first object of interest and the center location corresponds to the location of the center of the bounding box; and
    in an inference mode:
        passing an image into the neural network, wherein the image is not part of the dataset;
        automatically identifying a second object of interest; and
        automatically drawing a box around the second identified object of interest, wherein the box drawn around the second identified object of interest corresponds to the smallest possible bounding box around the second object of interest;
    wherein the neural network comprises a convolution-nonlinearity step and a recurrent step.

2. The method of claim 1, wherein the dataset comprises a plurality of images with known identified objects of interest.

3. The method of claim 1, wherein the convolution-nonlinearity step comprises a convolution layer and a rectified linear layer.

4. The method of claim 1, wherein each layer in the convolution-nonlinearity step takes a third-order tensor as input and outputs a modified third-order tensor.

5. The method of claim 1, wherein the convolution-nonlinearity step comprises a plurality of convolution-nonlinearity layer pairs, each convolution-nonlinearity layer pair comprising a convolution layer followed by a rectified linear layer.

6. The method of claim 1, wherein the convolution-nonlinearity step consists of five convolution-nonlinearity layer pairs, each pair comprising a convolution layer followed by a rectified linear layer.

7. The method of claim 1, wherein the recurrent step comprises a quadratic recurrent layer.

8. The method of claim 1, wherein the recurrent step comprises a plurality of recurrent layer pairs, each recurrent layer pair comprising a quadratic recurrent layer followed by a linear layer.

9. The method of claim 7, wherein the quadratic recurrent layer takes as input two first-order tensors and outputs a single first-order tensor.

10. The method of claim 8, wherein the output of a first quadratic recurrent layer is used as input into a second quadratic recurrent layer.

11. The method of claim 8, wherein the linear layer outputs a first-order tensor with at least one dimension.

12. The method of claim 11, wherein the at least one dimension includes the x and y coordinates of the center of the bounding box, the height of the bounding box, the width of the bounding box, and a probability that the bounding box is accurate.

13. The method of claim 12, wherein the output of a quadratic recurrent layer is used as input into a subsequent quadratic recurrent layer unless a linear layer in the recurrent step outputs a probability of less than 0.5 that the bounding box is accurate.

14. The method of claim 1, wherein, during the training mode, parameters in the neural network are updated using a stochastic gradient descent.

15. The method of claim 1, wherein, during the inference mode, the neural network will automatically output exactly the same number of boxes as the number of identifiable objects of interest.

16. A system for neural network object detection, comprising:
    one or more processors;
    memory; and
    one or more programs stored in the memory, the one or more programs comprising instructions to operate in a training mode and an inference mode;
    wherein in the training mode, the one or more programs comprise instructions to:
        pass a dataset into the neural network;
        train the neural network to accurately output a box size and a center location of an object of interest, wherein the box size corresponds to the smallest possible bounding box around the object of interest and the center location corresponds to the location of the center of the bounding box;
    wherein in the inference mode, the one or more programs comprise instructions to:

pass an image into the neural network, wherein the image is not part of the dataset;
automatically identify an object of interest;
automatically draw a box around the identified object of interest, wherein the box drawn around the identified object of interest corresponds to the smallest possible bounding box around the object of interest; and
wherein the neural network comprises a convolution-nonlinearity step and a recurrent step.

17. The system of claim 16, wherein the dataset comprises a plurality of images with known identified objects of interest.

18. The system of claim 16, wherein the convolution-nonlinearity step comprises a convolution layer and a rectified linear layer.

19. The system of claim 16, wherein each layer in the convolution-nonlinearity step takes a third-order tensor as input and outputs a modified third-order tensor.

20. A non-transitory computer readable storage medium storing one or more programs configured for execution by a computer, the one or more programs comprising instructions to operate in a training mode and an inference mode;

wherein in the training mode, the one or more programs comprise instructions to:
pass a dataset into the neural network;
train the neural network to accurately output a box size and a center location of an object of interest, wherein the box size corresponds to the smallest possible bounding box around the object of interest and the center location corresponds to the location of the center of the bounding box;

wherein in the inference mode, the one or more programs comprise instructions to:
pass an image into the neural network, wherein the image is not part of the dataset;
automatically identify an object of interest;
automatically draw a box around the identified object of interest, wherein the box drawn around the identified object of interest corresponds to the smallest possible bounding box around the object of interest; and
wherein the neural network comprises a convolution-nonlinearity step and a recurrent step.

* * * * *